US009978162B1

(12) United States Patent
Brett

(10) Patent No.: US 9,978,162 B1
(45) Date of Patent: May 22, 2018

(54) RULES-BASED CAUSALITY VISUALIZATION FRAMEWORK

(71) Applicant: Cisco Technology, Inc., San Jose, CA (US)

(72) Inventor: Constance M. Brett, Salt Spring Island (CA)

(73) Assignee: Cisco Technology, Inc., San Jose, CA (US)

( * ) Notice: Subject to any disclaimer, the term of this patent is extended or adjusted under 35 U.S.C. 154(b) by 77 days.

(21) Appl. No.: 14/674,238

(22) Filed: Mar. 31, 2015

(51) Int. Cl.
| | |
|---|---|
| G06F 17/30 | (2006.01) |
| G06T 11/20 | (2006.01) |
| G06T 11/60 | (2006.01) |
| H04L 12/26 | (2006.01) |

(52) U.S. Cl.
CPC ...... *G06T 11/206* (2013.01); *G06F 17/30572* (2013.01); *G06F 17/30873* (2013.01); *G06T 11/60* (2013.01); *H04L 43/045* (2013.01)

(58) Field of Classification Search
None
See application file for complete search history.

(56) References Cited

U.S. PATENT DOCUMENTS

| | | | | |
|---|---|---|---|---|
| 6,219,053 | B1 * | 4/2001 | Tachibana | G06F 3/0481 345/440 |
| 2011/0219324 | A1 * | 9/2011 | Watanabe | G06F 3/048 715/771 |
| 2015/0377936 | A1 * | 12/2015 | Ghosh | G01R 21/133 702/60 |

OTHER PUBLICATIONS

Cesario, "Visualizing Uncertainty in Graphs," University of California Santa Cruz, Spring 2010, 6 pages.
Chou, et al, "PaperVis: Literature Review Made Easy," EuroVis 2011: Eurographics/IEEE Symposium on Visualization 2011, vol. 30 (2011), No. 3, Jun. 2011, 10 pages.
Namata, "A Dual-View Approach to Interactive Network Visualization," In Proceedings of the Sixteenth ACM Conference on Conference on Information and Knowledge Management, CIKM'07, Nov. 2007, pp. 939-942.

* cited by examiner

*Primary Examiner* — Matthew Salvucci
(74) *Attorney, Agent, or Firm* — Edell, Shapiro & Finnan, LLC

(57) ABSTRACT

A method and associated apparatus for generating a radial causality visualization including accessing a data store storing a first set of data and a second set of data, the first set of data and the second set of data being in a predetermined hierarchical relationship with each other, plotting the first set of data as nodes disposed on a first shape (e.g., circle, ring, rectangle, etc.) of a plurality of concentric shapes of a displayed visualization, plotting the second set of data as nodes on a second shape of the plurality of concentric shapes of the displayed visualization, wherein the second shape is disposed radially further outward from a center of the plurality of concentric shapes compared to the first shape, and displaying on the displayed visualization respective connecting lines that connect nodes disposed on the first shape with nodes disposed on the second shape.

15 Claims, 8 Drawing Sheets

RULES-BASED CAUSALITY VISUALIZATION FRAMEWORK

TECHNICAL FIELD

Embodiments described herein relate to generating a displayable visualization of data having causal relationships.

BACKGROUND

In today's complex computing world, managers are inundated with data, and the volume and disparate form of such data can make it difficult to assess the nature or overall indication(s) of the data. More specifically, electronic network managers, for example, are becoming increasingly technically savvy and are often desirous of increasingly comprehensive data to review and analyze. That is, such managers are often left wanting when presented with relatively simple statistics or summaries that mask or hide many, if not all, of the technical details behind them. Indeed, many managers have deep technical knowledge and wish to understand more about their systems and the impact changing events might have on their networks and, in turn, their customers.

DESCRIPTION OF EXAMPLE EMBODIMENTS

Overview

A method and associated apparatus for generating a radial causality visualization are disclosed. In one embodiment, the method includes accessing a data store storing a first set of data and a second set of data, the first set of data and the second set of data being in a predetermined hierarchical relationship with each other, plotting the first set of data as nodes disposed on a first shape (such as a circle) of a plurality of concentric shapes of a displayed visualization, plotting the second set of data as nodes on a second shape of the plurality of concentric shapes of the displayed visualization, wherein the second shape is disposed radially further outward from a center of the plurality of concentric shapes compared to the first shape, and displaying on the displayed visualization respective connecting lines that connect nodes disposed on the first shape with nodes disposed on the second shape.

Example Embodiments

Figure 4:
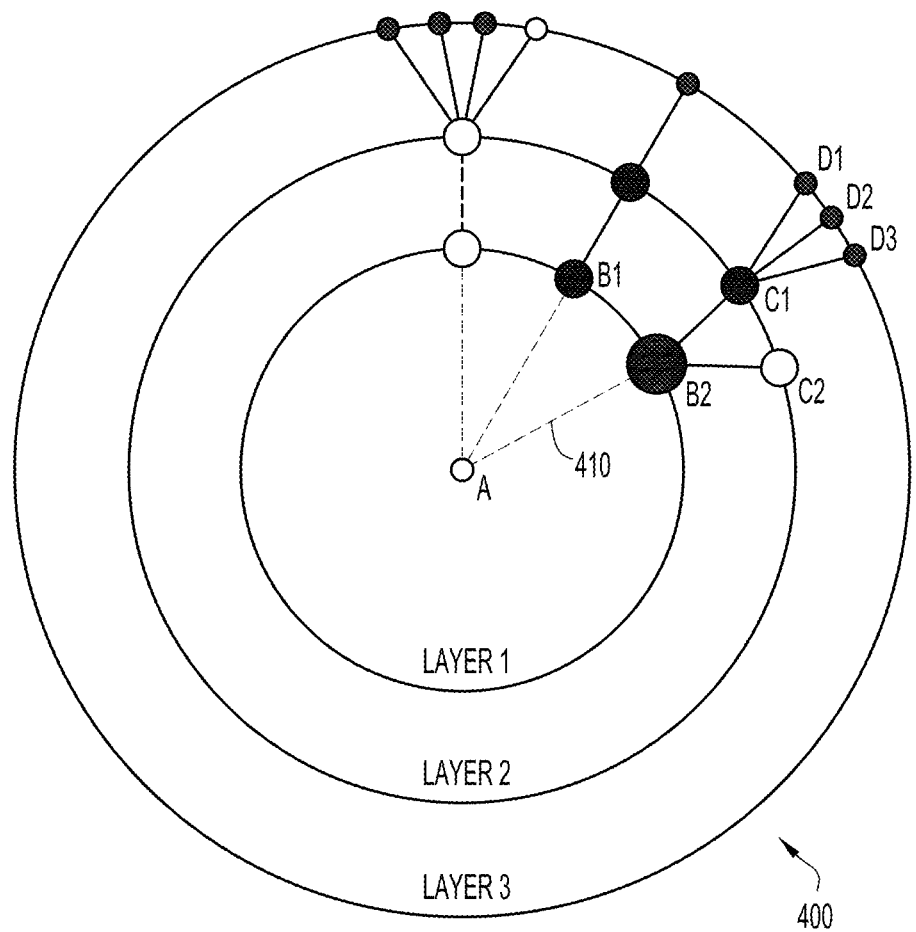
FIG. 4 depicts a simplified radial causality visualization according to an example embodiment.
Figure 5:
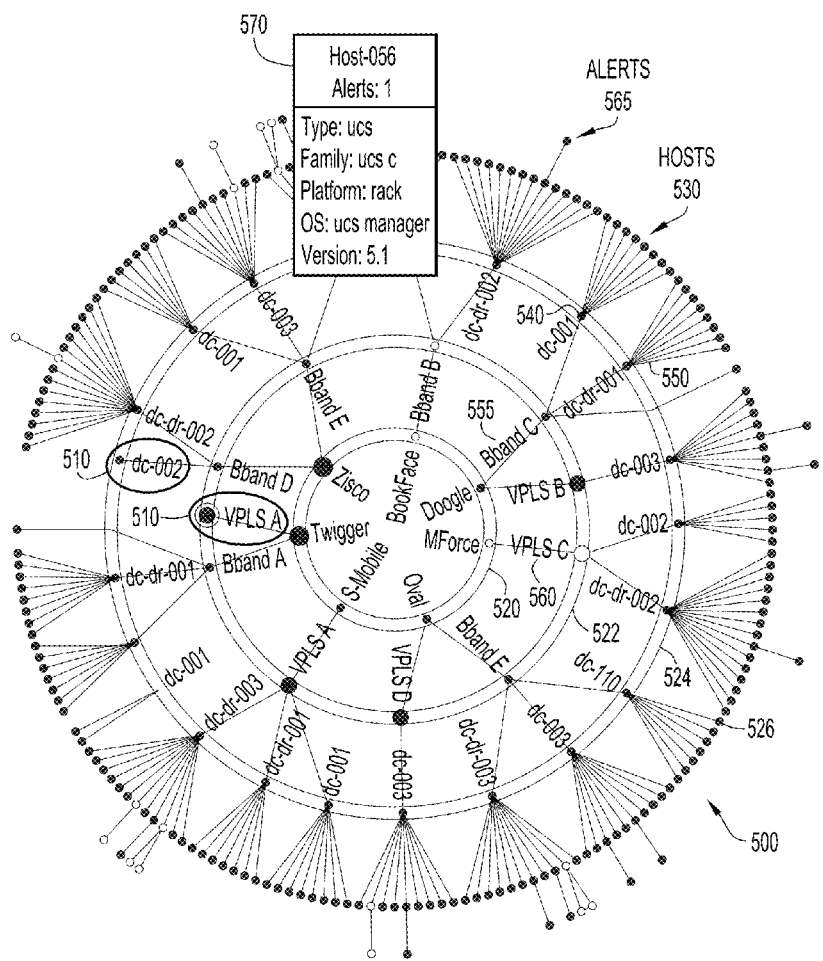
FIG. 5 depicts a more complex radial causality visualization including collapsed nodes according to an example embodiment.
Figure 6:
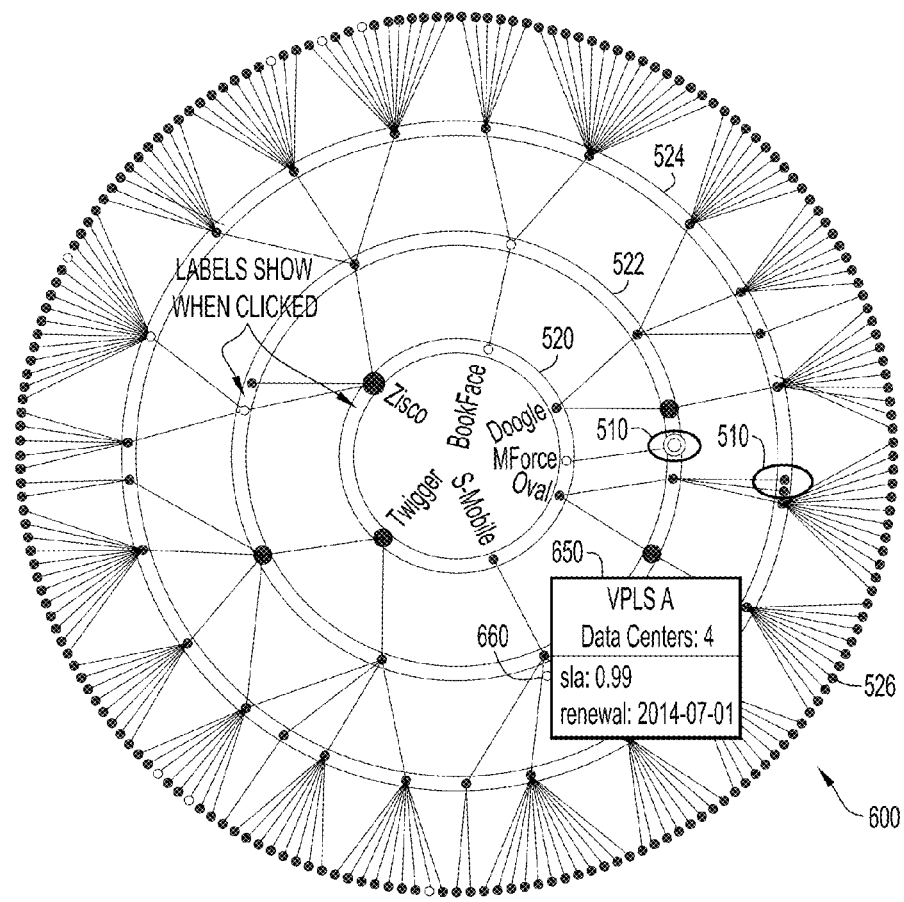
FIG. 6 depicts another radial causality visualization showing a hover event and masked or hidden labels in accordance with an embodiment.

Embodiments described herein are configured to analyze selected data with a rules engine, identify causal relationships in the data, and then generate a radial causality visualization representative of the selected data. In an embodiment, the radial causality visualization includes a plurality of concentric shapes, such as rectangles, rings or circles. In one implementation, each ring represents a hierarchical level in a hierarchical tree diagram that is representative of the data. Nodes, representative of selected data in a given category, are distributed around respective concentric rings. Nodes that are at the same hierarchical level are disposed on a same concentric ring or circle, and relationships flow from parent to child node (general to specific) as one moves outward from a center of the radial causality visualization. FIGS. 4-6 show example embodiments of a radial causality visualization, and will be described more fully later herein.

Figure 1:
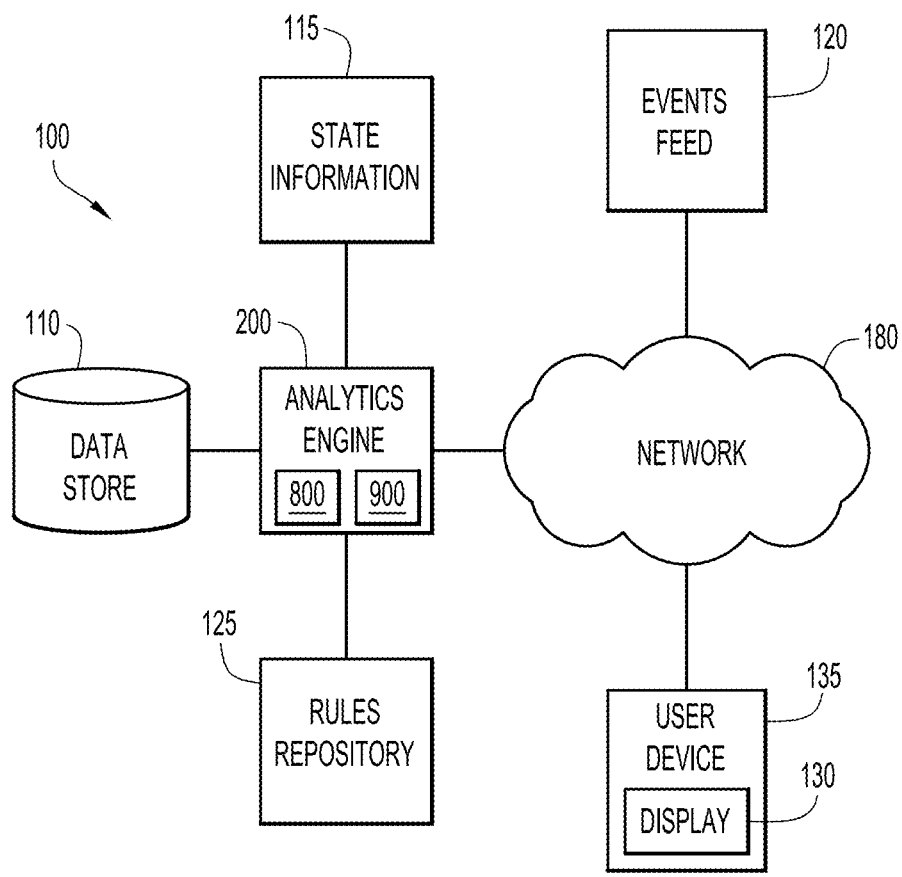
FIG. 1 is a block diagram of components that may be employed to implement a radial causality visualization according to an example embodiment.

Reference is now made to FIG. 1, which is a block diagram of components that may be employed to generate a radial causality visualization according to an example embodiment. The components shown in FIG. 1 may be collectively referred to as radial causality visualization system or apparatus 100. As shown in the figure, an Analytics Engine 200 is in communication with a data store 110, state information 115, events feed 120, a rules repository 125 and a display 130 associated with a user device 135.

As will be explained in more detail, the radial causality visualization system 100 enables a flexible event-driven framework that can provide visualization of many types of data whose state can be determined. In accordance with an embodiment, states, and state-changes, are tracked via monitored events. Such events give rise to causality among data points. State changes are driven through the use of rules in order to enable the methodology described herein to be extensible. Data that can be visualized can be as diverse as data from a monitored heating, ventilation and cooling (HVAC) system in an office building to sophisticated network security threats. Indeed, any system where events can be captured and can have a defined set of cause-and-effect relationships can potentially be a viable platform for which the presently described processing and visualization might be desired.

Referring again to FIG. 1, Analytics Engine operates as a central processing components and includes two sets of logic 800 and 900, which are described more fully later herein.

Data store 110 is configured to store data received from any number of sources. In a practical example, which will be used to describe the instant embodiments, the data is related to a network service provider that provides electronic data network service to multiple customers. Thus, the data that can be stored can include, but is not limited to, customers including customer name, customer contact, service including service name, service level agreement (SLA) agreement, agreement renewal date, datacenter information such as datacenter name, datacenter location, disaster recovery flag, device information including hostname, datacenter, service, device type, hardware family, hardware platform, operating system and software version, and alerts including alert identification (ID), severity, date, time, and device. Data store 110 may also store data relating to network hardware such as switches, routers, physical host devices, etc. and how each of those components may be physically connected to one another.

State information 115 may stored in or separately from data store 110, and may include information regarding the state of a given device or service as represented by a data point. For example, state information 115 might include an indication as to whether a given device (server or host) in the network is operational or not, whether a given SLA is in force, whether a datacenter is online, or whether a given version of an operating system is running on a given host.

Events feed 120 may be implemented, e.g., as a network connection that receives events from the network to be visualized. Events might include, among other things, whether a new host has come online, whether a previously operational host has now gone offline, or whether a new customer has been assigned to a given host, etc. Other events might include security attack events, performance changes, throughput thresholds, syslog events, or configuration changes events may be received over a network connection 180, such as the Internet, and stored in or separately from data store 110.

Rules repository 125 may be implemented as a database and may include user-defined rules configured with the particular expected data to be received and to be visualized in mind. More specifically, the use of a rules engine can help to separate logic from implementation details. The ability of users to update rules in a repository enables the radial causality visualization system to be flexible to changing needs. In one implementation, rules may govern the color of given nodes depending on the state of the information being depicted in the visualization. For instance, for a given data center that is being visualized, if any device (e.g., host, switch, firewall, load balancer, etc.) is in an inoperative state (but would normally be expected to be operative), the visualization might color the data center representation on the radial causality visualization in yellow (e.g., as a caution signal, versus, e.g., green, which might indicate that all devices are operating nominally). If an unexpected fault were experienced among the devices in the data center, then a rule might cause the representation of the data center to be colored red. Rules might also control the size of representations of nodes on a radial causality visualization. For example, a rule might be configured to cause a representation of a data center to be related to an amount of traffic that is processed by the data center.

Display 130 may be a physical display connected to a user device 135 such as computer, laptop, wireless, device, tablet, or smartphone. As will be explained further herein, Analytics Engine 200 analyzes and organizes data to be visualized and ultimately generates a radial causality visualization to be displayed on display 130 and, enables the visualization to be manipulated, to at least some degree, by a user via user device 135. Display 130 and user device 135 may be remote from analytics engine 200 and in communication with each other via network 180.

To organize data in a meaningful way for purposes of the radial causality visualization, and in accordance with embodiments described herein, an understanding of causality is helpful. Causality is a distinct concept from correlation, and it is instructive to examine these concepts briefly. Causality is a directional cause-effect relationship between two items (objects, concepts, etc.). Causation does not imply correlation—at best it implies highly mutual information about the items. Correlation is the relationship between two changing items (variables). It is a mathematical description of how two items change together and this relationship does not imply that there is a cause-effect system at play between the two. The systems and methodologies described herein, on the other hand, utilize the notion of causality among data points. Such causality leads to the ability to arrange the selected data in a hierarchical manner that lends itself well to the radial causality visualization to be rendered and depicted.

Figure 2:
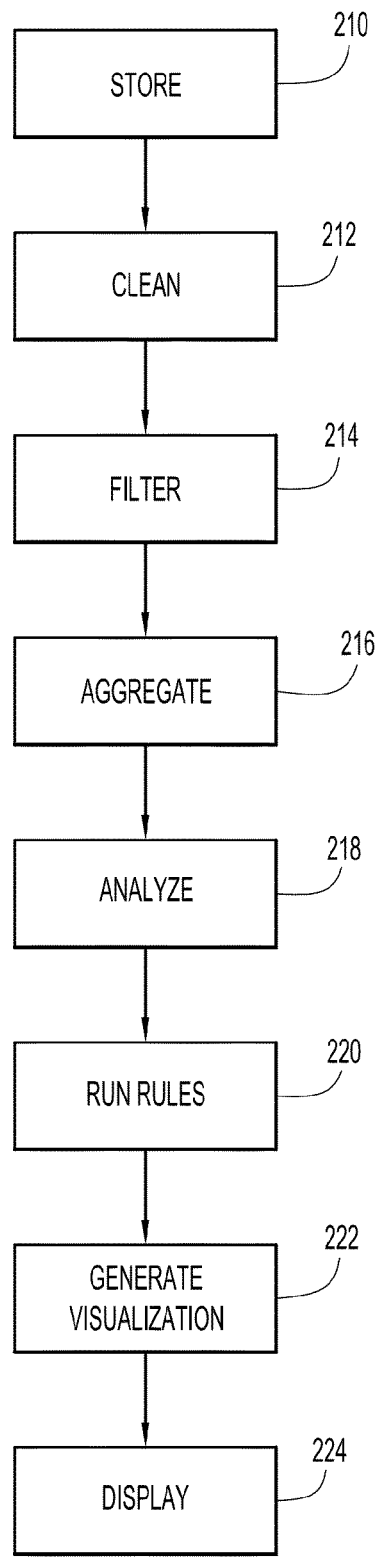
FIG. 2 is an example flow chart depicting a series of operations for processing data to implement a radial causality visualization according to an example embodiment.

Reference is now made to FIG. 2, which illustrates an example flow chart depicting a series of operations for processing data to implement a radial causality visualization according to an example embodiment. At 210, data to be visualized is stored or accessed in a data store, such as data store 110. The data is then cleaned at 212. Cleaning the data may include removing superfluous data, removing redundant data, sorting the data and/or formatting the data for subsequent operations.

At 214, the data is filtered. Data filtering might include removing data that is not going to be included in further analysis or a given visualization. In an embodiment, how data is filtered may be user selectable via a user interface presented via, e.g., display 130.

At 216, the data is aggregated. Data aggregation in accordance with an embodiment may include grouping categories of data in a hierarchical manner to facilitate generating and rendering the radial causality visualization. As one example, it may be helpful to aggregate a plurality of ping events (e.g., "down" pings) from a given device into a single "down" event, etc.

At 218 the data is further analyzed by, e.g., applying analytical models to the data. For example, network traffic pattern data may be run through a model that determines if the pattern is normal or abnormal.

At 220, rules are applied to the data to establish how certain aspects of the radial causality visualization are to be rendered. As noted above, rules might cause certain features of the radial causality visualization to have certain colors or size depending on what is being represented. In one embodiment, a Drools rule engine is implemented for this feature. Drools is available from Red Hat (Raleigh, N.C.) and is a rule management system (RMS) with a forward and backward chaining inference based rules engine, also known as a production rule system. Rules can be developed based on the nature of the data to be visualized.

Ultimately, at 222 and 224, the radial causality visualization is generated and displayed for a user to view and, in some cases, manipulate and/or customize.

Figure 3:
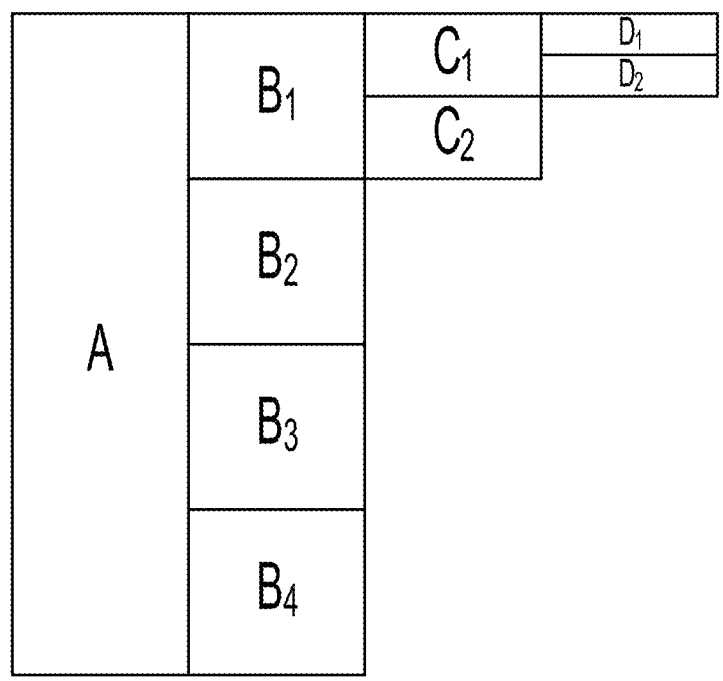
FIG. 3 is a simplified database schema that organizes data into a hierarchical structure that can be rendered as a radial causality visualization according to an example embodiment.

FIG. 3 is a simplified database schema that organizes data into a hierarchical structure that can be rendered as a radial causality visualization according to an example embodiment. By inspection, it can be seen that the database schema shown in the figure is hierarchical in that each data point or node to the left is a single parent node with respect to nodes to the right. That is, node or data point "A" is parent to nodes $B_1$ to $B_4$. Likewise, node $B_1$ is parent to nodes $C_1$ and $C_2$. And, $C_1$ is parent node to nodes $D_1$ and $D_2$. The database schema of FIG. 3 may be the result of operations described with respect to FIG. 2, particularly, the aggregate operation 216. Those skilled in the art will appreciate that other schemas are possible and compatible with the radial causality visualization system described herein.

As will be explained in more detail later herein, different sets of data are combined and then ultimately organized in accordance with a hierarchical schema like that shown in FIG. 3. In the context of the network service provider example, one set of data may be customer data, and the other set of data may be system or device (hardware) data. The operations in FIG. 2 result in data sets being mapped to one another so that, e.g., the rendered visualization can show which customers are being serviced by which data centers or hosts, etc.

Once data is populated into a hierarchical schema, a radial causality visualization can be generated. One example of a radial causality visualization according to an example embodiment is shown in FIG. 4. As can be seen, the radial causality visualization 400 is in the form of a radial tree diagram having concentric shapes, in this case rings or circles. Rectangles and other shapes may also be employed. A center point, represents a highest level in the hierarchy, in this case a data point labeled "A" and is consistent with the schema of FIG. 3. At each successive layer, ring or circle, child nodes are disposed and connected with its respective parent node through a connector, one of which is identified as 410.

In the radial causality visualization 400 of FIG. 4, nodes can be configured to have different sizes (compare B1 and B2, for example) and nodes can also be configured to have different colors (not expressly shown) based on a given state of the item or device that the data point or node represents. Rules applied to the data can determine how any given data point or node is shown.

Through the use of data-driven visualization, minor changes in the underlying data will be less likely to disrupt the overall rendering of the visualization. In addition, the system can operate in close to real-time, where time lag might be associated with how long it takes to process incoming events that lead to database changes, or states of devices or items being represented.

A goal of the radial causality visualization 400 shown in FIG. 4 is to show causal relationships throughout the hierarchy. This can be accomplished using node size and color, as explained above. As also noted, nodes that are at the same hierarchical level are arranged within a same concentric circle and relationships flow from parent to child (general to specific) as one moves outward from the center of the diagram.

As a result, a user can look at this type of diagram and immediately visualize the state of, e.g., their network connectivity.

The data displayed on the radial causality visualization 400 of FIG. 4 is cleaned, filtered and aggregated (as explained with respect to FIG. 2) for concise viewing and is arranged to have defined relationships between levels in the hierarchy. That is, the data is configured to comport with the database schema that is selected. Where multiple parents exist for a child, the child branch may be duplicated onto the parents. In this way, the diagram is simplified for trace-back of causality for the user. More specifically, when multiple parents exist for a child it basically means that multiple trees exist with the children duplicated on each tree. To achieve an effective visualization, each level of the hierarchy is configured to have a unique connection to the previous level.

In one embodiment, the radial causality visualization system 100 is implemented using JavaScript making the result reasonably easy to integrate into many development frameworks. As a result, the radial causality visualization can be delivered via many different visualization constructs such as dashboards, reports, or integration tools.

Where too many nodes might crowd a given hierarchical level, regrouping or re-categorization of the nodes can be helpful, including re-centering the diagram on a clicked upon node. A supplementary display of historical data showing additional details on a node or hierarchy level could also be added in a sidebar.

FIG. 5 depicts a more complex radial causality visualization 500 including collapsed nodes 510 according to an example embodiment. In this radial causality visualization 500, there is no single parent node disposed at the center of the visualization. Instead, several highest level parent nodes are disposed around a first inner ring 520 of the diagram 500. In this case, that highest hierarchical level represents a plurality of network customers being serviced. Nodes representing hosts 530 are arranged around a furthest outside circle 526. Nodes representing data centers 540 are arranged on a next inside circle 524. Data center nodes 540 are connected to their respective nodes representing hosts 530 via connection lines 550. In one implementation, the nodes representing the hosts 530 and the nodes representing the data centers 540 are distributed evenly around their respective circles.

Circle 522, inward from the circle 524 on which the nodes representing data centers 540 are disposed, is a circle on which an indication of a type of network connection is provided. As examples, in some instances a broadband connection is indicated, and in other instances a virtual private LAN service (VPLS) is indicated. And, as noted, on the innermost circle 520, nodes representing network customers being serviced are disposed. The indicated names are provided as examples only.

Collapsed nodes 510 facilitate readability of the radial causality visualization 500. In an embodiment, a user can collapse some of the data that is being presented so that, for example, text placed on and around the radial causality visualization 500 can be more easily read. That is, a collapsed node can be configured to have no child nodes displayed. In an embodiment, display 130 is configured to show a cursor (controlled, e.g., by a mouse or other pointing device of user device 135), which can be used to select a given collapsed node 510 and cause that node to expand, thereby showing all connections to the other child nodes in the radial causality visualization 500.

As still further shown in FIG. 5, an alert 565 (in the form of, e.g., a small circle extending radially outwardly from circle 526) can be rendered with respect to a given host 530. By hovering a cursor, for example, over the alert, a more detailed description 570 of the alert can be presented.

FIG. 6 depicts another radial causality visualization 600 showing a hover event and showing how labels can be hidden. That is, compared to FIG. 5, most labels have been hidden from view, but, in accordance with an embodiment, can be become viewable once again by clicking, for example, on a given ring or circle. Information 650, provided when a cursor 660 hovers over a selected position, provides data about, in this case, VPLS A.

In an embodiment, the D3 framework (d3js.org) is utilized to provide part of the visualization. D3 is employed because it can be configured to provide a full-featured data-driven visualization. For effective presentation, it is desirable to drive non-static visualizations from the data side to increase reliability, flexibility, and maintainability in an environment that expects to utilize changing data. In addition, the D3 framework is extremely flexible in providing user interaction tie-ins for functionality such as tooltips, styling, clicks, etc. Cascading style sheets may be employed where practical to capture sets of formatting for different nodes and hierarchy (inheritance) or multiple classes to keep code in a main html page as straightforward as possible.

Referring again to FIGS. 5 and 6, the overall diagram in both visualizations 500, 600, is a tree layout with radial projection of the coordinate system (r, theta) to visualize nodes and links. Nodes are disposed around the concentric circles, and links may be implemented as straight (shown) or curved paths between nodes. As mentioned, the nodes can be collapsed or expanded by, e.g., clicking on a given node.

Tooltip functionality is utilized to provide additional data on each node, e.g., information 570 and 660.

The following describes, in more detail, an approach for generating a radial causality visualization according to an embodiment.

Operations, instructions or logic 800 executed by Analytics Engine 200—Set Up.

The following operations or logic 800 are performed by Analytics Engine 200. Logic 800 may be performed each time input data changes, i.e., a new event is received, or on a regular, periodic basis.

Logic 800 is configured to create a related set of database tables for customer relationships by establish a schema where each relationship takes the form of a tree of unique records and each data point (e.g., customer name, SLA, etc.) is loaded as a unique record to populate the database (e.g., data store 110).

Logic 800 is further configured to create a related set of database tables of system devices by establishing a schema where each relationship among devices takes the form of a tree of unique records and each data point (e.g., host, data center, etc.) is loaded as a unique record to populate the database (e.g., data store 110).

Logic 800 is still also configured to create a set of database tables enumerating relationships between customers and system device tables by establishing a schema relating the customer and device schemas and establish relationships between customer and system tables to populate joint tables.

Logic 800 is further configured to create a schema of records that can reference any value in another database plus a result value that may have predefined states (e.g., logic 800 is configured to access state information 115 and be responsive to events feed 120.

Logic 800 is still further configured to create rules in a rules-engine that operates to identify states of system devices. In accordance with an embodiment, each rule is executed in turn with all databases provided as reference data. Rule engine output is written into customer-event-relationships database tables, e.g., in data sore 110.

Logic 800 is further configured to read all the input databases and result databases and to write to storage the result records. As noted, the trees defined in the database schemas are hierarchical. In one embodiment, all nodes at a given level in the hierarchy are equidistant from the root of the tree and are assigned the same level. In this regard, levels may be numbered from root to leaf starting at zero. The relationship database is used to guide structure of the output to storage. Each relationship tree is written to storage as a unique record where the unique record contains a set of one or more nodes in which only one node is considered the "root" of the tree, the node for which is the lowest level in the set of the tree nodes. The storage format preserves the hierarchical information within each relationship tree.

Operations, instructions or logic 900 executed by Analytics Engine 200—Operation The following operations or logic 900 may be triggered upon receive of user input. Logic 900 may be performed each time a user accesses or refreshes, e.g., a web page via which the user can view a radial causality visualization according to the embodiments described herein.

In one embodiment, logic 900 is configured to create a custom html program that converts x, y (Cartesian) coordinates to r, theta (radial) coordinates.

Logic 900 is further configured to operate an html program that reads or re-reads the data stored in, e.g., data store 110. In one implementation, each record is converted into a javascript record, and additional attributes are added to the javascript record to store web browser visual attributes. Additional attributes may include information about the events or nodes that are not explicitly used in creating a tree. They might explain briefly the state of the node, or give, for instance, a geographical location detail not shown in the node name (e.g., address, or geo coordinates).

Logic 900 is still further configured to sort the javascript records by root node level, load the data onto the web browser session for use by other html programs, and check at scheduled intervals for changes in the output data. If a change is detected, logic 900 is rerun and initiated to redraw the data visualization.

More specifically, logic 900 is configured to instruct the web browser to draw concentric circles for each visible level present in the data, where concentric circles correspond from center outward to increasing level values, and align each tree's nodes to the concentric circle representing that level.

If visual properties are not present, initial visual properties may be set including, setting selected nodes to expanded and visible. The node collapsed indicator may be hidden and connections may be set to visible. Logic 900 is further configured to calculate the spacing for each visible node displayed and instruct the web browser regarding screen coordinates for nodes, and draw lines connecting visible related nodes.

Logic 900 is also configured to enable a user to affect parts of the data visualization. This includes creating an interactive element (e.g., an icon, not shown) to increment the number of levels shown on the radial causality visualization. This functionality operates as follows.

Logic 900 is configured to enable the element if there are levels of the hierarchy currently hidden, set visual properties on nodes and connections at lowest hidden level to visible, disable element if there are no further levels of hierarchy hidden, and redraw the radial causality visualization.

Logic 900 is also configured to create an interactive element (e.g., an icon, no shown) to decrement the number of levels shown on the diagram. This functionality operates as follows.

Logic 900 is configured to enable the element if there are more than, e.g., three levels of the hierarchy currently visible, set visual properties on nodes and connections at highest visible level to hidden, disable the element if there are three or fewer levels of the hierarchy currently visible, and redraw the radial causality visualization.

Logic 900 is still further configured to create an interactive element (e.g., an icon, not shown) to toggle hiding of certain status nodes. Specifically, the logic is operable to set visual properties on nodes that have a given status to the opposite of the current state (hidden/visible), set visual properties on connections that have one or more visible nodes to visible, set visual properties on connections that have no visible nodes to hidden, and redraw the radial causality data visualization.

Logic 900 is also configured to create tooltip functionality such that if a mouse is moved over a diagram element (node or connection), the tool tip is populated with data from the node or connection the mouse is over, cause the tooltip to move to the location of the mouse, and set tooltip element state to visible. Otherwise, the tooltip element state is set to hidden.

Logic 900 is still also configured to create node click functionality. In this regard the logic is operable to toggle a visual property state on the node to the opposite of the current state (collapsed/expanded). If the new state of the node is collapsed, the logic is configured to set visual properties on all connected nodes and connections with a higher level value to hidden, and set visual properties on the clicked node to show the collapsed indicator. Otherwise, the logic is configured to set the visual properties on all connected nodes and connections with a higher level value to visible, and set visual properties on the clicked node to hide the collapsed indicator.

Figure 7:
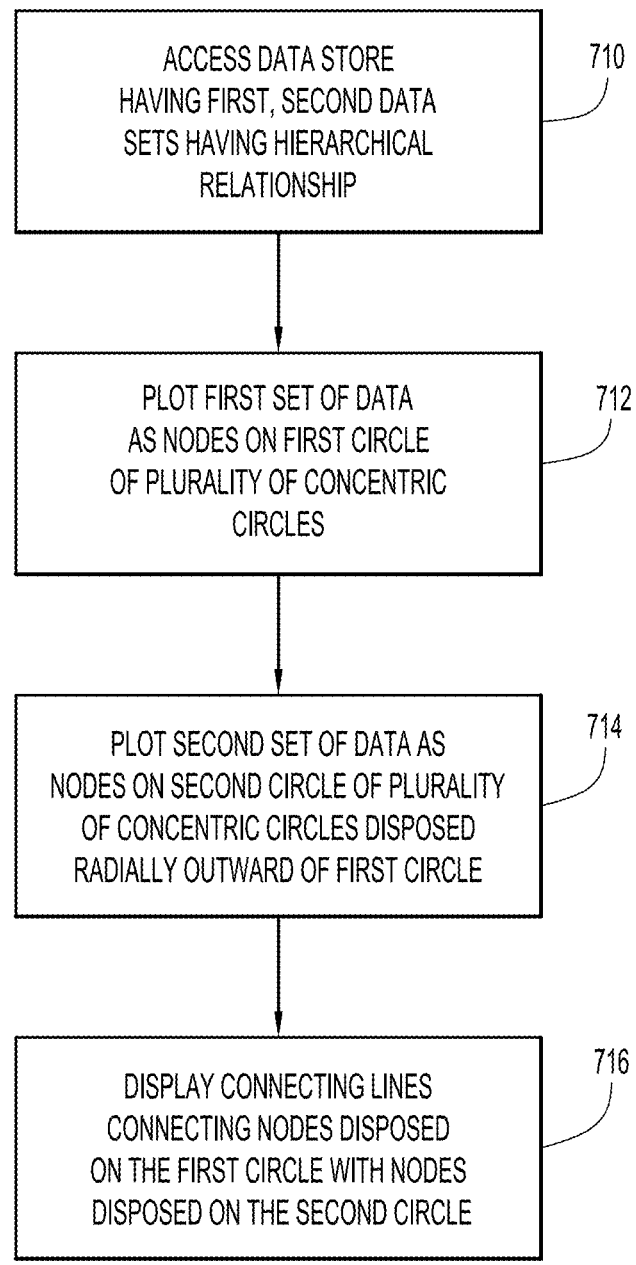
FIG. 7 depicts a flow chart illustrating a series of operations for generating a radial causality visualization in accordance with an embodiment.

In sum, a radial causality visualization is generated according to an embodiment by, as shown in FIG. 7, at 710, accessing a data store storing a first set of data and a second set of data, the first set of data and the second set of data being in a predetermined hierarchical relationship with each other, at 712, plotting the first set of data as nodes disposed on a first circle of a plurality of concentric circles of a displayed visualization, at 714, plotting the second set of data as nodes on a second circle of the plurality of concentric circles of the displayed visualization, wherein the second circle is disposed radially further outward from a center of the plurality of concentric circles compared to the first circle, and at 716, displaying on the displayed visualization respective connecting lines that connect nodes disposed on the first circle with nodes disposed on the second circle.

Figure 8:
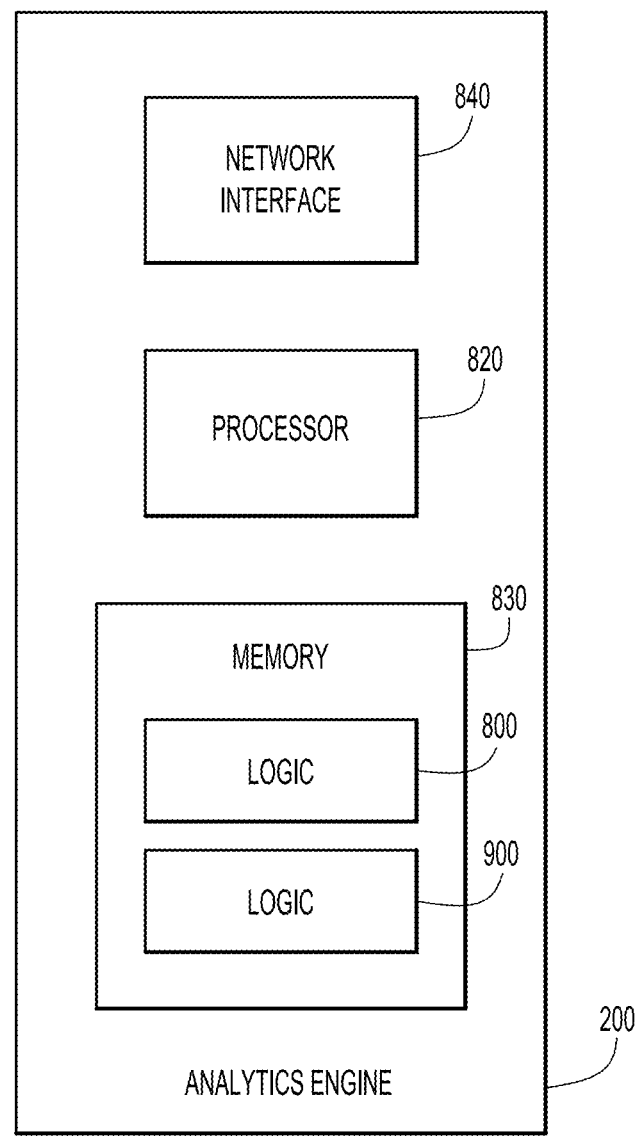
FIG. 8 depicts a block diagram of an analytics engine of a radial causality visualization rendering apparatus according to an example embodiment.

FIG. 8 depicts a block diagram of an analytics engine 200 for a radial causality visualization rendering apparatus according to an example embodiment. Analytics engine 200 includes a processor 820, memory 830 and a network interface unit 840. Processor 820 may be configured to perform the functions of logic 800 and logic 900, among other functions. Memory 830 is configured to store a variety of data and software instructions including logic 800 and logic 900. Memory 830 could also be employed to store data from data store 110, data for state information 115, or data from rules repository 125. Network interface unit 840 may include one or more ports or network interface cards via which analytics engine 200 can communicate with a network such as electronic network 180.

Processor 820 may be, for example, a microprocessor or microcontroller that executes instructions for implementing the processes described herein. Memory 830 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, memory 830 may comprise one or more tangible (non-transitory) computer readable storage media (e.g., a memory device) encoded with software comprising computer executable instructions and when the software is executed (by processor 820) is operable to perform the operations described herein.

To summarize, in one form, a method is provided comprising: accessing a data store storing a first set of data and a second set of data, the first set of data and the second set of data being in a predetermined hierarchical relationship with each other; plotting the first set of data as nodes disposed on a first circle of a plurality of concentric circles of a displayed visualization; plotting the second set of data as nodes on a second circle of the plurality of concentric circles of the displayed visualization, wherein the second circle is disposed radially further outward from a center of the plurality of concentric circles compared to the first circle; and displaying on the displayed visualization respective connecting lines that connect nodes disposed on the first circle with nodes disposed on the second circle In another form, an apparatus is provided comprising: a network interface unit configured to enable communications via a network; a memory configured to store logic instructions; and a processor, when executing the logic instructions, configured to: access a data store storing a first set of data and a second set of data, the first set of data and the second set of data being in a predetermined hierarchical relationship with each other; plot the first set of data as nodes disposed on a first circle of a plurality of concentric circles of a displayed visualization; plot the second set of data as nodes on a second circle of the plurality of concentric circles of the displayed visualization, wherein the second circle is disposed radially further outward from a center of the plurality of concentric circles compared to the first circle; and display on the displayed visualization respective connecting lines that connect nodes disposed on the first circle with nodes disposed on the second circle.

In another form, a non-transitory tangible computer readable storage media encoded with instructions that, when executed by a processor of a network device configured to perform networking resource resolution, cause the processor to: access a data store storing a first set of data and a second set of data, the first set of data and the second set of data being in a predetermined hierarchical relationship with each other; plot the first set of data as nodes disposed on a first circle of a plurality of concentric circles of a displayed visualization; plot the second set of data as nodes on a second circle of the plurality of concentric circles of the displayed visualization, wherein the second circle is disposed radially further outward from a center of the plurality of concentric circles compared to the first circle; and display on the displayed visualization respective connecting lines that connect nodes disposed on the first circle with nodes disposed on the second circle.

The above description is intended by way of example only. Various modifications and structural changes may be made therein without departing from the scope of the concepts described herein and within the scope and range of equivalents of the claims.

What is claimed is:
1. A method comprising:
   accessing a data store storing a first set of data and a second set of data, the first set of data and the second set of data being in a predetermined hierarchical relationship with each other;
   plotting the first set of data as nodes disposed on a first shape of a plurality of concentric shapes of a displayed visualization;
   plotting the second set of data as nodes on a second shape of the plurality of concentric shapes of the displayed visualization, wherein the second shape is disposed radially further outward from a center of the plurality of concentric shapes compared to the first shape;
   displaying on the displayed visualization respective connecting lines that connect nodes disposed on the first shape with nodes disposed on the second shape,
   wherein the first shape and the second shape are rings,
   wherein the nodes are distributed evenly around their respective rings;
   plotting a third set of data as nodes arranged concentrically around and radially further outward from a center of the plurality of concentric shapes compared to the second shape,
   wherein the nodes of the third set of data are plotted without a corresponding visible concentric shape, and wherein multiple nodes of the third set of data are connected, via respective connecting lines, to a same node plotted on the second shape; and monitoring an event associated with the first set of data, the second set of data, or the third set of data, analyzing the event with respect to a rule, and when the rule is triggered as a result of the event, updating the displayed visualization based on the event and rule.

2. The method of claim 1, further comprising indicating that an alert is present with respect to one of the nodes by displaying another node radially outward from the one of the nodes.

3. The method of claim 2, further comprising displaying textual information associated with the alert.

4. The method of claim 1, further comprising displaying labels adjacent at least some of the nodes, wherein the labels include text stored as part of the first data set or the second data set.

5. The method of claim 4, further comprising receiving input that causes the labels to be selectively hidden from view.

6. The method of claim 1, further comprising displaying at least one node as a collapsed node, wherein the collapsed node has no connecting lines extending radially outward therefrom.

7. The method of claim 1, further comprising receiving input that causes more or fewer shapes of the plurality of concentric shapes of the displayed visualization to be displayed.

8. An apparatus comprising:
a network interface unit configured to enable communications via a network;
a memory configured to store logic instructions; and
a processor, when executing the logic instructions, configured to:
access a data store storing a first set of data and a second set of data, the first set of data and the second set of data being in a predetermined hierarchical relationship with each other;
plot the first set of data as nodes disposed on a first shape of a plurality of concentric shapes of a displayed visualization;
plot the second set of data as nodes on a second shape of the plurality of concentric shapes of the displayed visualization, wherein the second shape is disposed radially further outward from a center of the plurality of concentric shapes compared to the first shape; and
display on the displayed visualization respective connecting lines that connect nodes disposed on the first shape with nodes disposed on the second shape,
wherein the first shape and the second shape are rings,
wherein the nodes are distributed evenly around their respective rings; and
plot a third set of data as nodes arranged concentrically around and radially further outward from a center of the plurality of concentric shapes compared to the second shape,
wherein the nodes of the third set of data are plotted without a corresponding visible concentric shape, and
wherein multiple nodes of the third set of data are connected, via respective connecting lines, to a same node plotted on the second shape; and
monitor an event associated with the first set of data, the second set of data, or the third set of data, analyze the event with respect to a rule, and when the rule is triggered as a result of the event, update the displayed visualization based on the event and rule.

9. The apparatus claim 8, wherein the processor, when executing the logic instructions, is further configured to:
indicate that an alert is present with respect to one of the nodes by displaying another node radially outward from the one of the nodes.

10. The apparatus of claim 9, wherein the processor, when executing the logic instructions, is further configured to:
display textual information associated with the alert.

11. The apparatus of claim 8, wherein the processor, when executing the logic instructions, is further configured to:
display labels adjacent at least some of the nodes, wherein the labels include text stored as part of the first data set or the second data set.

12. The apparatus of claim 11, wherein the processor, when executing the logic instructions, is further configured to:
receive input that causes the labels to be selectively hidden from view.

13. The apparatus of claim 8, wherein the processor, when executing the logic instructions, is further configured to:
display at least one node as a collapsed node, wherein the collapsed node has no connecting lines extending radially outward therefrom.

14. The apparatus of claim 8, wherein the processor, when executing the logic instructions, is further configured to:
receive input that causes more or fewer shapes of the plurality of concentric shapes of the displayed visualization to be displayed.

15. A non-transitory tangible computer readable storage media encoded with instructions that, when executed by a processor of a network device configured to perform networking resource resolution, cause the processor to:
access a data store storing a first set of data and a second set of data, the first set of data and the second set of data being in a predetermined hierarchical relationship with each other;
plot the first set of data as nodes disposed on a first shape of a plurality of concentric shapes of a displayed visualization;
plot the second set of data as nodes on a second shape of the plurality of concentric shapes of the displayed visualization, wherein the second shape is disposed radially further outward from a center of the plurality of concentric shapes compared to the first shape; and
display on the displayed visualization respective connecting lines that connect nodes disposed on the first shape with nodes disposed on the second shape,
wherein the first shape and the second shape are rings,
wherein the nodes are distributed evenly around their respective rings; and
plot a third set of data as nodes arranged concentrically around and radially further outward from a center of the plurality of concentric shapes compared to the second shape,
wherein the nodes of the third set of data are plotted without a corresponding visible concentric shape, and
wherein multiple nodes of the third set of data are connected, via respective connecting lines, to a same node plotted on the second shape; and
monitor an event associated with the first set of data, the second set of data, or the third set of data, analyze the event with respect to a rule, and when the rule is triggered as a result of the event, update the displayed visualization based on the event and rule.

* * * * *